United States Patent [19]

Krumenacker et al.

[11] Patent Number: 5,195,433
[45] Date of Patent: Mar. 23, 1993

[54] SYSTEM FOR PRINTING DOCUMENTS WITH A POST-MARKING ROLLER

[75] Inventors: Michel Krumenacker; Daniel ReBoul, both of Granges les Valence, France

[73] Assignee: Sextant Avionique, Cedex, France

[21] Appl. No.: 819,891

[22] Filed: Oct. 10, 1991

[30] Foreign Application Priority Data

Oct. 10, 1990 [FR] France ................ 90 12711

[51] Int. Cl.⁵ .......................... B41J 3/28; B41J 13/00; B41L 47/44
[52] U.S. Cl. .......................... 101/45; 400/44; 400/636
[58] Field of Search ............ 101/45; 400/44, 636

[56] References Cited

U.S. PATENT DOCUMENTS

| | | | |
|---|---|---|---|
| 3,373,439 | 3/1968 | Porteous, Sr. | 101/45 |
| 3,422,753 | 1/1969 | Strassner et al. | 101/45 |
| 3,757,942 | 9/1973 | Gunn | 101/45 |
| 3,896,721 | 7/1975 | See | 101/45 |
| 4,461,587 | 7/1984 | Schöttle | 400/44 |
| 4,850,725 | 7/1989 | Walker et al. | 400/236.2 |
| 4,920,258 | 4/1990 | Saito | 400/636 |
| 5,080,509 | 1/1992 | Stone | 400/44 |

FOREIGN PATENT DOCUMENTS

| | | | |
|---|---|---|---|
| 3700869 | 7/1988 | Fed. Rep. of Germany | 400/636 |
| 2296531 | 7/1976 | France | |
| 2583341 | 12/1986 | France | |
| 0135163 | 8/1984 | Japan | 400/44 |
| 1214122 | 12/1970 | United Kingdom | 101/45 |

Primary Examiner—Edgar S. Burr
Assistant Examiner—Anthony H. Nguyen
Attorney, Agent, or Firm—Lowe, Price, LeBlanc & Becker

[57] ABSTRACT

A system for printing a document (1) comprises a first motor (5) for driving the document with respect to the frame along a first horizontal direction, the document being vertically arranged; a printer (7) coupled to a vertical linear displacement system (9, 11, 12), and designed to print information on the document; a post-marking roller (17) bearing symbols liable to be selectively pressed on the document with interposition of an ink ribbon (19) associated with running means; a second motor (15) coupled to driving means (13, 14) of the printer and roller; and a clutch (24, 28, 30) for coupling the running means to the first motor (5) only when the printer is in a predetermined range of displacement.

5 Claims, 2 Drawing Sheets

SYSTEM FOR PRINTING DOCUMENTS WITH A POST-MARKING ROLLER

BACKGROUND OF THE INVENTION

The present invention relates to systems for print-ing documents, comprising a coded magnetic printing.

More particularly, the invention, relates to machines used to automatically print cheques, allowing to write on a first surface of the cheque, on the one hand, directly readable information corresponding for example to the amount of a transaction and to its date and, on the other, in the form of magnetically readable coded characters, for example CMC7 characters, additional information concerning the amount of the cheque to enable identification by magnetic reading during processing of the cheque by the bank. This coded information is generally achieved by means of a roller bearing the characters or codes to be printed that can be pressed on the cheque with interposition of a magnetic ink ribbon. The roller is generally called post-marking roller because, conventionally, the magnetic coded mark was carried out once the cheque was filled in. Means are also provided for forming on the second surface, or back surface, of the cheque an endorsement for identifying the recipient.

In such machines, it is necessary to provide, as will be seen later on, the displacement of the printing head, the displacement of the cheque, the rotation of the post-marking roller and the running of the ink ribbon.

Each of these four movements has to be controlled in a determined way during definite operation phases of the machine. Therefore, a priori, four motors must be provided, for example, stepping motors.

SUMMARY OF THE INVENTION

An object of the invention is to reduce the number of motors and therefore to reduce the cost and complexity of a cheque printing machine.

More particularly, the invention provides to use a first motor simultaneously actuating the displacement of the printing head and the rotation of the roller, and a second motor directly acting on the displacement of the cheque and, through a clutch, on the displacement the ink ribbon during the periods the postmarking roller is operating.

More specifically, the invention provides a system for printing a document comprising: a frame; means associated to a first motor for driving the document with respect to the frame in a first horizontal direction, the document being vertically placed; a printer coupled to the frame by a vertical linear displacement system, and designed to print information on the document; a post-marking roller bearing symbols liable to be selectively pressed on the document with interposition of an ink ribbon associated with running means; a second motor coupled to means for driving the printer and the roller; and a clutch means for coupling the running means to the first motor only while the printer is in a determined displacement range.

According to an embodiment of the invention, clutching is caused by cooperation with a tip which is displaced along with the printer and, preferably, this tip acts while the printer is close to its limit of travel.

BRIEF DESCRIPTION OF THE DRAWINGS

The foregoing and other objects, features and advantages of the invention will be apparent from the following detailed description of preferred embodiments as illustrated in the accompanying figures wherein.

DETAILED DESCRIPTION OF THE INVENTION

Figure 1:
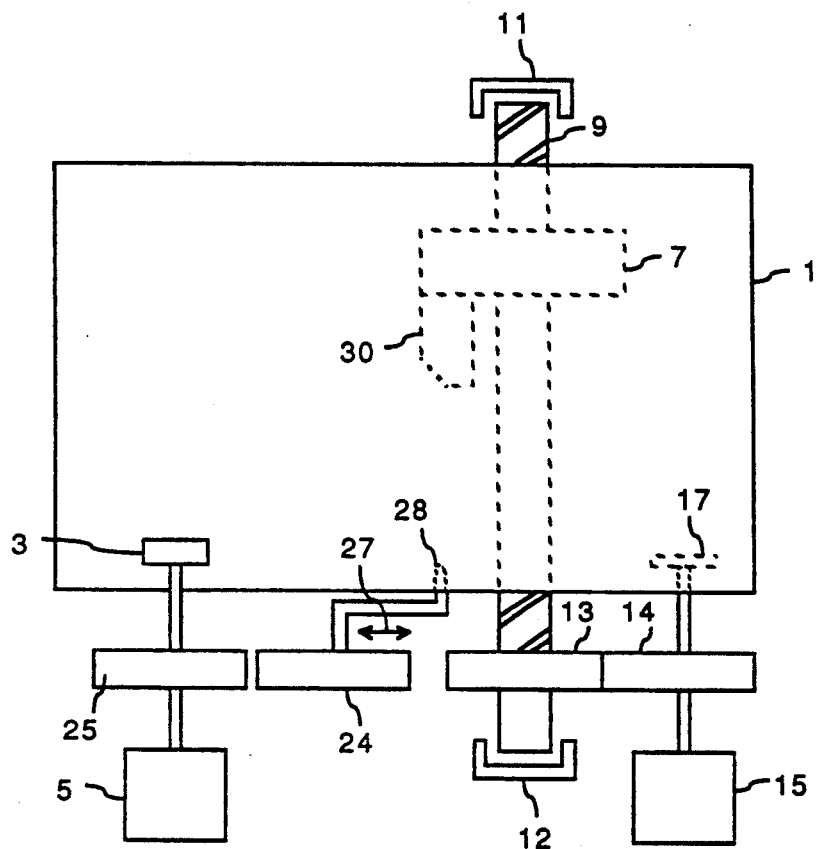
FIG. 1 is a very schematic rear view of the overall arrangement of a cheque printing machine according to the invention.

FIG. 1 shows some components of a cheque printing machine. In the figure, are schematically shown the only components useful for understanding the invention. It is clear that the machine comprises a frame (not shown) on which are fixed some of the represented components. The machine comprises a supporting plate (not shown), integral with the frame for receiving a cheque 1, the back surface of which is shown in FIG. 1. The supporting plate is arranged so that the cheque can be inserted vertically.

Figure 3:
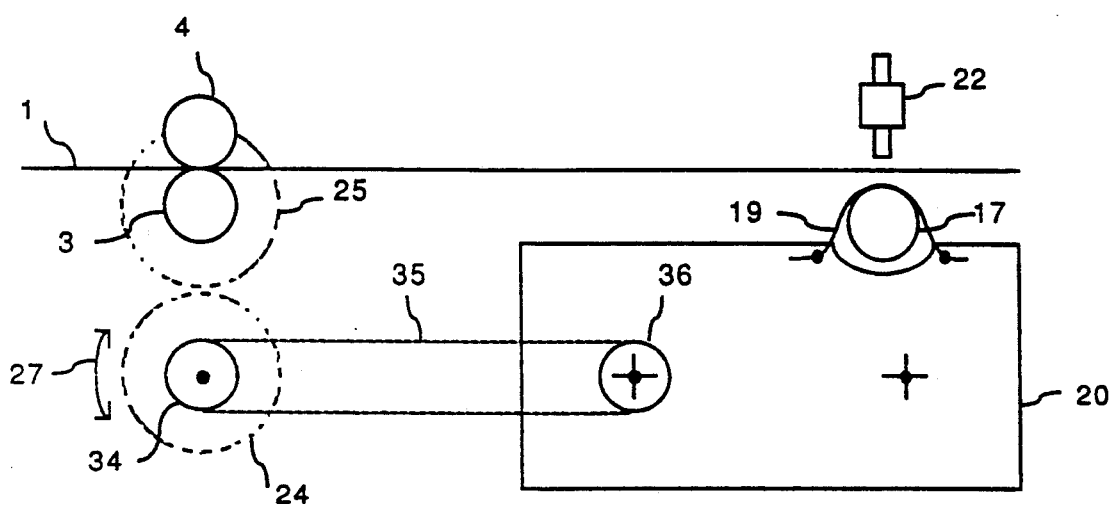
FIG. 3 is a schematic top view of an embodiment of a clutch according to the invention.

A driving roller 3 enables the cheque to slide along the plane of the figure. The top view of FIG. 3 shows the cheque 1, the driving roller 3 and an idle roller 4, on the side of the front surface of the cheque, cooperating with the roller 3 for driving the cheque. The driving roller 3 is actuated by a motor 5, usually a reversing stepping motor.

A printer 7, for example an ink-jet printer, is arranged near the front surface of the cheque. The printer can be vertically displaced because of its cooperation with a screw 9 mounted on bearings 11, 12 integral with the machine frame. A clutch system 13, 14 or a toothed belt system enables the screw to be rotated by a second motor 15. The second motor 15 also rotates a post-marking roller 17.

As shown in FIG. 3, roller 17 is arranged adjacent to the front surface of cheque 1. An ink ribbon 19 placed in a cassette 20, is interposed between the roller and the cheque. An electromagnet 22 actuates a hammer for hitting the cheque in front of the roller, to press it against the latter and to print the document at predetermined periods.

The machine operates according to a predetermined programme.

During a first phase, the cheque is vertically introduced at a place where it can be taken by rollers 3, 4.

During a second phase, the cheque is horizontally displaced by rollers 3 and 4 while printer 7 is positioned at determined vertical positions and the front surface of the cheque is conventionally printed. It will be noted that, during all the phases of the vertical displacement of the printer, the post-marking roller is rotated but this does not cause any printing action.

During a third phase, the programme activates motors 5 and 15 and the electromagnet 22 to move the cheque forward at determined places, to position the post-marking roller in rotation and to activate the electromagnet 22 at desired times.

A problem which is still to be solved with such a system is the running of the ink ribbon 19. In fact, if the ribbon is coupled to either motor 5 or 15, it will move forward and backward and will come back on used portions, or, if one chooses a coupling mode such that the displacement of the ribbon can be made in one direction, a large amount of ribbon will be used unnecessarily. Thus, in the prior art, specific means for driving ribbon 19, independently of the operation of motors 5 and 15, are provided. This requires the addition of complex means associated, for example, to the operation of the electromagnet 22 or the provision of an additional driving motor, triggered during each operation of the electromagnet 22.

To solve this problem, the invention provides to drive the ribbon, by means of motor 5, through a clutch system operating only for predetermined positions of the printer, during post-marking operations.

Figures 2A, 2B:
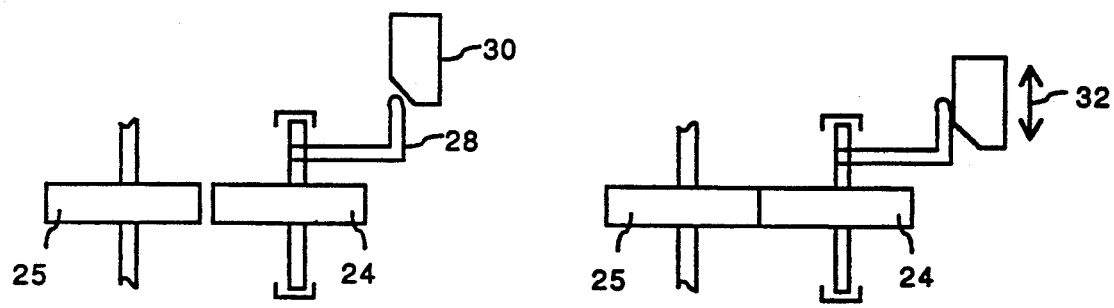
FIGS. 2A and 2B schematically show the operation of a clutching means used according to the invention.

According to an embodiment of the invention shown in FIG. 1, the forward run of the ribbon is associated with the rotation of a pinion gear 24. The pinion gear is arranged adjacent to a pinion gear 25 integral with the axle of motor 5. The pinion gear 24 can be displaced in the direction shown by arrow 27 by means of an engaging lever 28. This engaging lever can cooperate with a tip 30 associated with the displacement of the printer 7. Thus, when printer 7 goes down and arrives close to its limit of travel, pin 30 abuts against lever 28 and starts urging pinion gear 24 against pinion 25 (FIG. 2A). Then, during the travel referenced 32 in FIG. 2B, pinion 24 remains engaged with pinion 25 and the ribbon is shifted whereas motor 5 runs and the cheque is displaced. Travel 32 must be sufficient to correspond to a predetermined number of rotations of roller 17 to successively print the selected characters. Thus, ribbon 19 is run only during the post-marking period.

The major part of FIG. 3 has already been described. It will be noted that it shows as a top view only a part of the components shown as a rear view in FIG. 1, namely, the only components useful for explaining the running operation of the ink ribbon. For the sake of simplification, pinion 24 is shown differently of the case of FIGS. 1, 2A and 2B and the engaging lever is not represented. The motion designated by arrow 27 in FIG. 1 is still designated by an arrow 27 is FIG. 3 although it is not illustrated in the same direction. The axle supporting pinion 24, mobile according to the direction of arrow 27, is integral with a concentric pinion 34 coupled by a belt 35 to a pinion 36 driving the ribbon of cassette 20.

Thus, with the invention, only two motors are necessary to provide the running of the cheque, the displacement of the printer, the rotation of the post marking roller and the running of the ink ribbon 19, which is accordingly not unnecessarily used.

Of course, the above described system can be implemented in various ways by those skilled in the art. For example, the translation displacement of printer 7 could be achieved by a device other than a screw, for example by a rack system. Similarly, the clutch could be actuated during a displacement phase of the printer other than during its limit of travel.

Moreover, additional systems can be coupled to a machine implementing the invention. For example, it is possible to provide a stamp for endorsement on the back face of the cheque. This stamp, conventionally activated by an electromagnet, can be mechanically displaced by a lever system capable of swinging under the effect of the displacement near the limit of travel of printer 7, immediately before or after post-marking is achieved by roller 17.

On the other hand, the invention is described in the case the document to be printed is a cheque. It is clear that it applies to any other document on which it is desired to print front and back faces similar to those above described.

We claim:
1. A system for printing a document (1) comprising:
    a frame; a first motor;
    means (3, 4) associated with the first motor (5) for driving the document with respect to the frame along a first horizontal direction, the document being vertically arranged; a vertical linear displacement system;
    a printer (7) coupled to said frame by means of said vertical linear displacement system (9, 11, 12) for printing information on the document;
    a post-marking roller (17) bearing symbols to be selectively pressed on the document, an ink ribbon (19) associated with said post-marking roller and means for intermittently driving said ink ribbon;
    a second motor (15) for driving said vertical linear displacement system;
    clutching means (24, 28, 30) for coupling the means for intermittently driving said ribbon to said first motor (5) only when the printer is in a predetermined range of its vertical displacement.

2. A printing system according to claim 1, including a tip (30) connected to move with the printer to cause clutching.

3. A printing system according to claim 2, wherein said tip causes clutching while the printer is close to its limit of travel.

4. A printing system according to claim 1, wherein said document is a check.

5. A printing system according to claim 1, wherein said ink ribbon (19) is a magnetic ink ribbon.

* * * * *